United States Patent [19]
Hild, II

[11] Patent Number: 5,421,505
[45] Date of Patent: Jun. 6, 1995

[54] SOLDER WIRE DISPENSING DEVICE

[76] Inventor: Mark Hild, II, 156 Standord, Irvine, Calif. 92715

[21] Appl. No.: 258,249

[22] Filed: Jun. 10, 1994

[51] Int. Cl.⁶ .................................................. B23K 3/06
[52] U.S. Cl. ...................................... 228/41; 228/244; 226/128; 226/162
[58] Field of Search ............... 228/41, 52, 244, 247; 226/128, 158, 162, 167

[56] References Cited

U.S. PATENT DOCUMENTS

| | | | |
|---|---|---|---|
| 2,432,428 | 2/1946 | Lang | 228/52 |
| 2,751,485 | 6/1956 | Sauer | 228/53 |
| 2,952,763 | 3/1958 | Gustafsson | 228/53 |
| 3,070,057 | 7/1959 | Dezzani | 226/128 |
| 3,101,689 | 10/1961 | Hammond et al. | 219/230 |
| 3,707,258 | 12/1972 | Schlitt | 228/41 |
| 3,824,371 | 7/1974 | Schurman, Jr. | 226/127 |
| 3,852,565 | 12/1974 | Kager | 228/53 |
| 4,199,096 | 4/1980 | Keefe et al. | 228/52 |
| 4,521,673 | 6/1985 | Oury | 228/53 |
| 4,660,743 | 4/1987 | Speisebecher et al. | 226/127 |
| 4,746,050 | 5/1988 | Brown | 228/19 |

FOREIGN PATENT DOCUMENTS

1086393  4/1965  United Kingdom .

Primary Examiner—Samuel M. Heinrich
Attorney, Agent, or Firm—Price, Gess & Ubell

[57] ABSTRACT

A gun-shaped solder-dispensing device dispenses adequate and controlled lengths of solder wire for use in soldering plumbing joints and like tasks. The shape makes it easy to dispense solder and hold it to a heated workpiece all with one hand. The device contains an arcuate toothed drive which comprises about one-quarter of a circle. Thus, it is possible to contain a drive wheel of a large effective diameter in a compact housing. A trigger lever is linked to the drive wheel so that pulling the trigger lever with the fingers of a hand holding the device will dispense a length of solder. The drive wheel acts as a ratchet because it is linked to the trigger lever by pivoting connecting linkages. This allows the toothed wheel to move up into contact with the solder wire before it begins to revolve and move the solder forward. A pressure roller backs the solder to allow a variety of solder diameters to be accommodated. When the trigger lever is released, the drive wheel moves out of contact with the solder before moving to its starting position. Thus, the toothed drive wheel acts as a ratchet and does not move the solder wire in a reverse direction.

16 Claims, 6 Drawing Sheets

SOLDER WIRE DISPENSING DEVICE

BACKGROUND OF THE INVENTION

1. Field of the Invention

The present invention relates generally to the art of soldering or brazing and, more specifically, to a held-held device to dispense lengths of solder wire for use in soldering plumbing joints and like applications.

2. Description of Related Art

A successful device for dispensing solder wire or similar materials should be easily operated with one hand so that the operator's other hand can be used to hold a torch or other heat source. Furthermore, the device should be adaptable so that different diameters of solder wire can be easily used. A logical shape for a one-hand-operated dispenser is a gun-like shape that can be operated by pulling a "trigger." Such a shape allows the unit to be easily grasped with one hand and operated by using one's fingers to grasp and squeeze a trigger-like dispensing lever. Preferably, a single pull of the "trigger" should dispense a length of wire sufficient for any soldering job because it is virtually impossible to provide an even-soldered joint if the trigger must be operated repeatedly during the soldering operation.

Although the prior art contains a number of devices that combine a solder dispenser and a soldering iron, no devices have been directed towards dispensing greater lengths of larger-diameter solder for use in soldering plumbing and the like. Several prior art devices have adopted a "gun-like" shape, but they all suffer from a lack of adaptability to different diameter solder wires and/or an inability to dispense sufficient solder in a single operation. For example, U.S. Pat. No. 2,432,428 to Lang shows a combination solder dispenser and soldering iron. The unit has a gun-shaped housing and operates by a pawl-bearing trigger member which engages gear teeth on the edge of a grooved roller. When the roller is rotated by the pawl, the solder wire, which is held in the grooved roller by a companion roller, is advanced. However, the unit is limited to solder wire with a diameter small enough to fit into the grooved roller.

The pawl/gear tooth interaction forms a ratchet so that the solder moves in one direction only. One can readily appreciate that the maximum length of solder wire that can be dispensed in one movement is equal to a circumference of the grooved roller. In actual practice, the mechanism is constructed so that only about a length of solder equal to one-quarter of the circumference of the roller can be dispensed because a single pull of the trigger turns the roller only about one-quarter revolution. One practical way to increase the length of solder dispensed is to increase the size of the grooved roller. However, the roller size is limited by a desire to provide a compact unit.

Another combination soldering iron/solder dispenser is shown in U.S. Pat. No. 2,952,763 to Gustafsson. In this device, the solder wire runs between a detente-bearing cog wheel and a roller. A trigger member engages the cog wheel so that pulling the trigger member will rotate the cog wheel and advance the solder. A wire spring acts as a pawl, preventing backwards rotation of the cog wheel when the trigger member returns to an initial position. This device, like the first-described unit, is not readily adaptable to various diameters of larger solder wire. Furthermore, the length of solder dispensed per pull of the trigger member is limited by the cog wheel's diameter.

U.S. Pat. No. 3,852,565 to Kager shows another solder dispenser. Again, a toothed wheel is used to dispense the solder wire. The toothed wheel, driven by a trigger lever, presses the solder wire against a pressure spring. This arrangement allows the device to accommodate solder wire of varying diameters. However, the maximum length of dispensed solder is limited by a diameter of the toothed wheel.

U.S. Pat. No. 4,521,673 to Oury also uses a toothed drive wheel which presses the solder wire against a spring-loaded roller. This arrangement allows for some variation in the diameter of the dispensed solder, but the dispensed length is again limited by, a diameter of the toothed wheel. Another variation on the toothed drive wheel is shown in U.S. Pat. No. 2,751,485 to Sauer. Again, the dispenser is gun-shaped with the dispensing action effected by pulling a trigger lever. Here a toothed wheel rotates through the action of a pawl attached to the trigger lever. Changes in solder diameter are accommodated by having the drive wheel axle mounted in slots so that the drive wheel slides into contact with the solder wire regardless of the diameter of the wire. However, a diameter of the feed wheel still controls the maximum length of the dispensed solder.

OBJECTS AND SUMMARY OF THE INVENTION

It is an object of the present invention to provide a device for dispensing solder wire that can be held and operated with one hand;

It is another object of the present invention to provide a device that is readily adaptable to a variety of diameters of solder wire; and It is an further object of the present invention to provide a device that dispenses a sufficient length of solder wire in a single operation.

Accordingly, these and further objects are met by a solder-dispensing device with a substantially gun-shaped aspect. A reel of solder wire is contained within the body of the device and is dispensed from the "barrel" region of the device. A handle and a trigger lever descend from a lower surface of the body so that the device can be grasped with one hand. The device is operated by using the fingers of that hand to pull the trigger lever towards the device's handle. When the trigger lever is pulled, an arcuate toothed ratchet, linked to the trigger lever by pivoting connecting linkages, first moves into contact with the solder wire pressing it against a spring-mounted pressure roller. The ratchet then rotates towards the barrel end of the "gun" gripping the solder wire and dispensing a length of it. The trigger lever returns to its resting position when released. As the arcuate ratchet returns, it moves away from contact with the solder, thus preventing it from moving the solder wire in a reverse direction.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a solder wire dispenser which can accommodate a variety of solder wire diameters and which is capable of dispensing lengths of solder sufficient for pipe joints and similar tasks.

There is a significant need for a tool to dispense solder wire for use in soldering plumbing and similar applications. Normally, copper plumbing is soldered using a lead-free solder and a propane torch or similar heat-generating tool. A pipe joint to be soldered is cleaned and assembled and may also be coated with a flux material. Then the joint is heated with the torch and, while the torch is still heating the joint, a length of solder wire is touched to the hot joint. The solder melts and flows into the joint. After cooling the solder forms a mechanically strong, waterproof barrier that holds the pipes together.

If the solder is directly held with one's fingers, there is a significant danger of getting burned either by accidentally touching the hot pipe or the flame, or by heat conducted through the solder. Furthermore, solder and/or flux may be toxic or irritating and really should not be touched. However, it is clumsy to use a pliers or other common tool to hold the solder during the soldering process. If excess solder is pressed onto the hot pipe joint, a sloppy, solder-wasting joint is formed. Because lead-free solder is notoriously expensive, there is considerable motivation to avoid using excess solder. However, if an insufficient amount of solder is used, the joint may leak.

Prior art solder dispensers have been unable to readily accommodate the large-diameter solder wire used in the plumbing arts, and the drive mechanisms have been unable to rapidly dispense a sufficient length of solder. As already discussed, some sort of toothed drive wheel driven by a trigger lever is common to many solder-dispensing devices. A maximum length of solder dispensed by a trigger-driven toothed wheel is determined by an extent of wheel rotation and a diameter of the wheel. The larger the wheel diameter and the greater the extent of rotation, the longer the piece of solder dispensed.

Without a complex arrangement of gears, a simple trigger lever is generally unable to turn a drive wheel much more than about one-quarter of a revolution with a single pull of the trigger. The present invention has maximized the length of solder dispensed by using only one-quarter of a drive wheel (the effective part of most drive wheels) with a diameter of the wheel greatly increased over the prior art. A full drive wheel of the effective diameter of the drive wheel of the present invention would be impossible to fit into a conveniently-sized housing.

Figures 1, 2, 4:
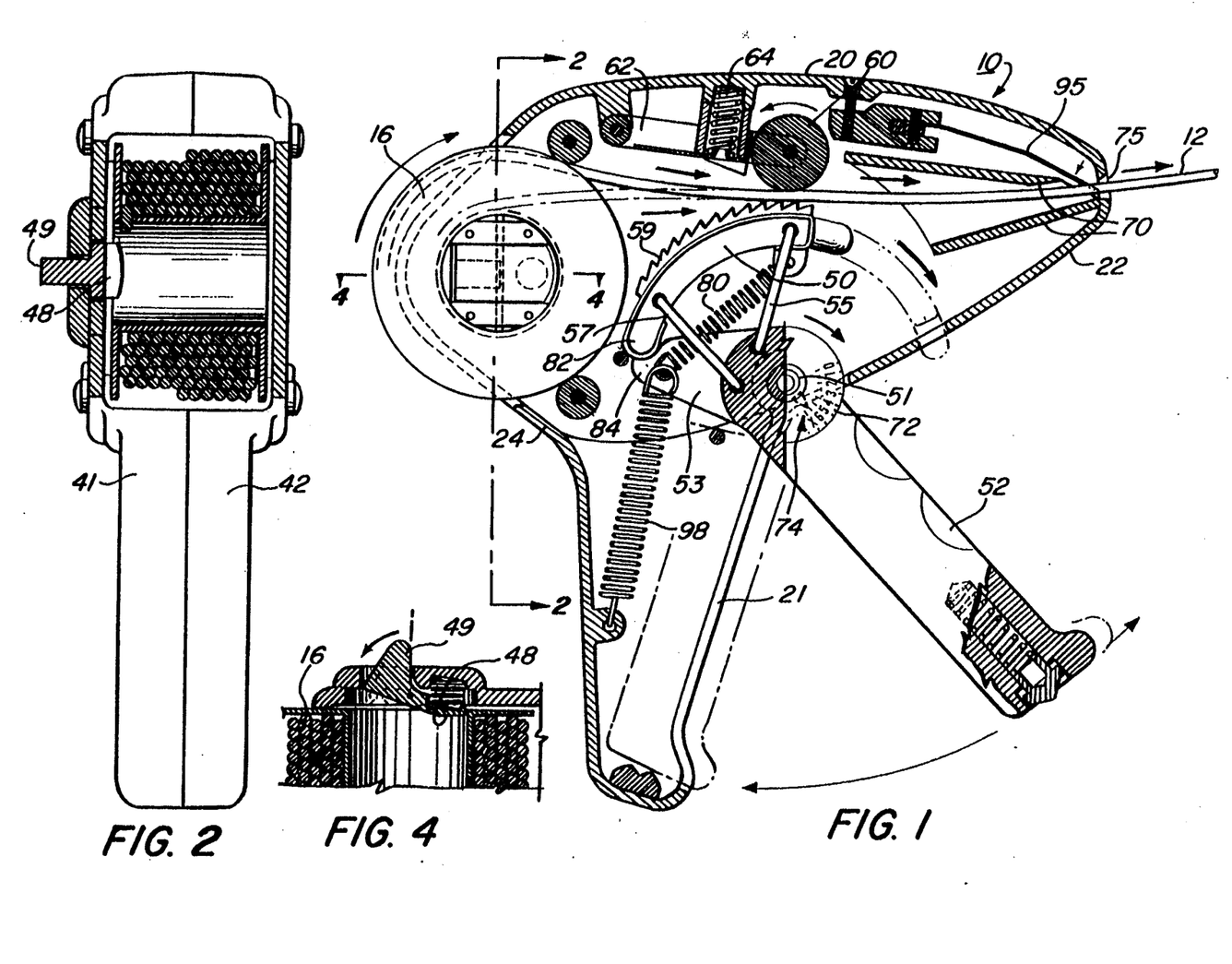
FIG. 1 is a sectional diagrammatic view of the present invention.
FIG. 2 is a section of the present invention taken through 2—2 of FIG. 1.
FIG. 4 is a section through a rear portion of the present invention taken through 4—4 of FIG. 1 to show the reel and its retaining system.

FIG. 1 shows a cross-section through the solder-dispensing device 10 of the present invention. A gun-shaped housing 20 has a front or dispensing end 22 from which solder 12 is dispensed and a rear source end 24 shaped to partially enclose a reel 16 of solder wire. The housing 20 bears a large handle 21 descending from the source end 24. The housing 20 is substantially hollow and is formed from a left half 41 and a right half 42 as is shown in FIG. 2. The housing 20 can be molded from a variety of materials including plastics and metal. In actual use, the dispenser 10 will probably be used to hold a length of solder 12 to a heated joint for soldering or brazing. Therefore, it is preferred to construct the housing 20 from a heat-resistant material. Alternatively, the housing 20 can be made as a compound structure (not shown) with the front end 22 constructed of metal, ceramic, or other heat-resistant materials and the remainder of the housing 20 constructed of ordinary plastics.

Figure 3:
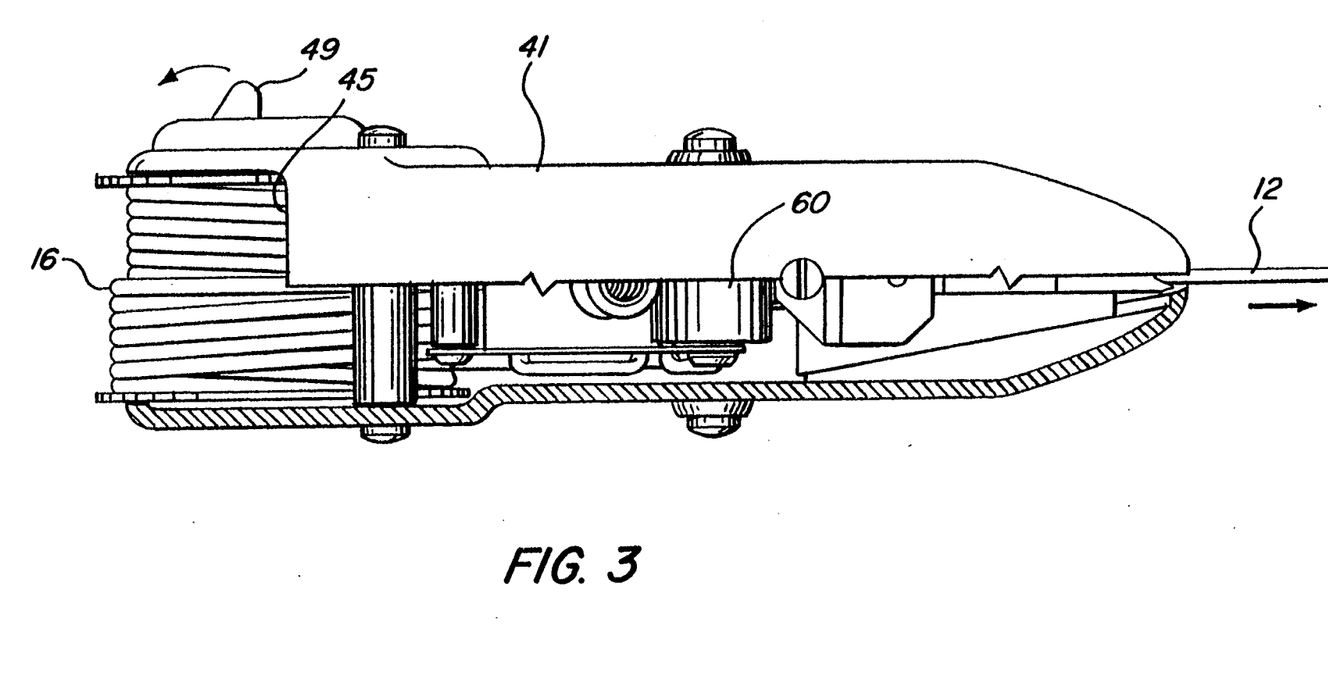
FIG. 3 is a top view of the present invention in which the top portion of one of the housing halves has been cut away.

The housing 20 is constructed with a rear portion 45 (see FIG. 3) cut away to expose the reel 16 of solder. The reel 16 is retained by a pivoting, spring-loaded tab 48. As shown in FIG. 2, an outer end 49 of the tab 48 is accessible from the outside of the device 10, thereby allowing an operator to disengage the reel 16 by pressing the outer end 49 of the tab 48 and to replace one reel with another reel. From the reel 16 the solder wire 12 extends towards the front or dispensing end 22 of the housing 20. The solder 12 passes between an arcuate ratchet 50 and a pressure roller 60 and into a guide assembly 70 that directs the solder to a dispensing orifice 75. At the dispensing orifice 75 an antireversal spring pawl 95 contacts the solder 12.

Figure 5:
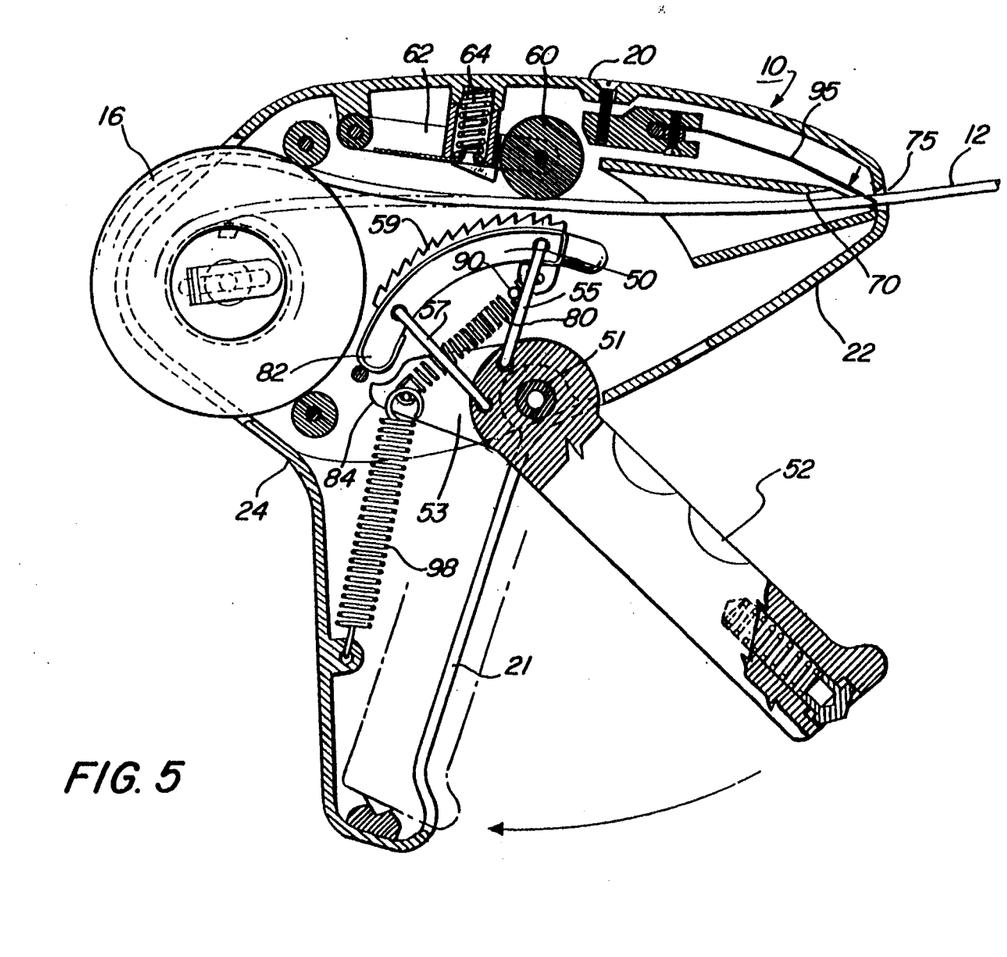
FIG. 5 shows a sectional view similar to FIG. 1 with the trigger lever in its forwardmost position.

Descending from a lower surface of the housing 20 is a large trigger lever 52 which pivots on a pivot 51. The trigger lever 52 is positioned so that it can be grasped and operated by fingers of a hand holding the device 10 by the handle 21. An upper end 53 of the trigger lever 52 above the pivot 51 is angled towards the rear or source end 24 of the housing 20. As shown in FIG. 5, when the handle 52 is in its completely forward position, the ratchet 50 does not contact the solder wire 12.

When the trigger lever 52 is moved towards the handle 21 (see FIG. 6), the upper trigger end 53 moves towards the dispensing end 22. The arcuate ratchet 50 is pivotally attached to the upper end 53 of the trigger lever by a pair of rear connecting linkages 57 (only one is shown) and a pair of front connecting linkages 55 (only one is shown). Pulling the trigger lever 52 towards the handle 21 causes the arcuate ratchet 50 to contact the solder wire 12 and propel it towards the front end 22, thereby dispensing a length of solder 12 through the orifice 75. As explained already, the maximum length dispensed is approximately equal to the length of the ratchet 50. A guide 72 is marked on the trigger lever 52. This guide 72 moves past an indicator pointer 74 on the housing 20, thus allowing a user to gauge the approximate length of the dispensed solder.

Figure 6:
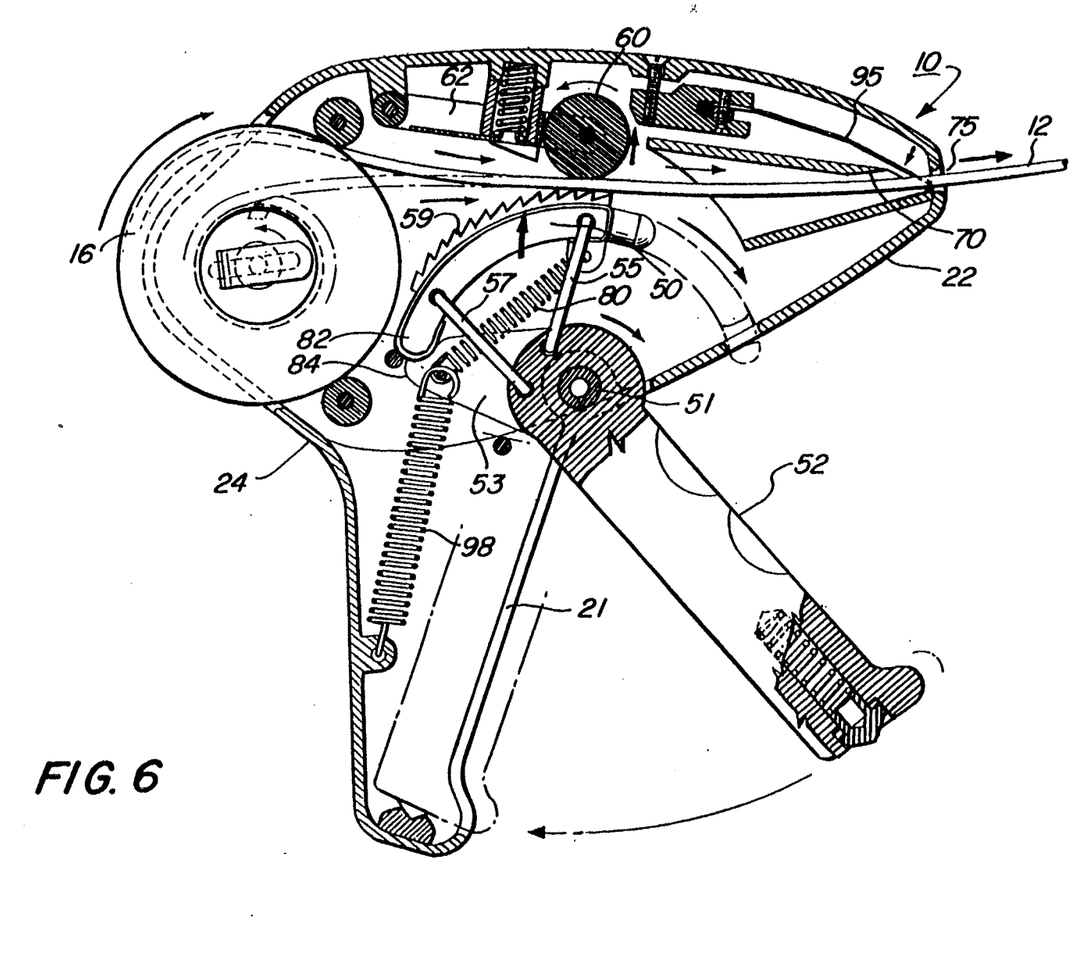
FIG. 6 shows a sectional view similar to FIG. 5, but with the trigger lever pulled to the rear enough for the ratchet to engage the solder wire.

The ratchet 50 is characterized as a ratchet because it achieves a one-way movement of the solder 12. This movement does not involve an interaction with a pawl as in a true ratchet. Rather, the arcuate ratchet 50 is mounted on the connecting linkages 55, 57 so that it can move in a direction perpendicular to a longitudinal axis of the solder wire 12, as well as in a direction parallel to the longitudinal axis of the solder 12. Thus, as shown in FIG. 6, when the trigger lever 52 is pulled, the arcuate ratchet 50 first moves up in a perpendicular direction to contact the solder wire 12. It then moves parallel to the solder wire 12 to dispense the solder wire 12.

Finally, when the trigger lever 52 is returning to its starting position, the arcuate ratchet 50 first moves, in a perpendicular direction, away from the solder. Then it moves parallel to the solder to its starting position without touching the solder 12. This behavior of the ratchet 50 will now be elaborated.

The arcuate ratchet 50 bears, on an upper surface, a series of teeth 59 that point towards the dispensing end 22. The ratchet 50 comprises about one-quarter of a circle. The teeth 59 of the ratchet 50 are preferably constructed from metal or some quite hard material because they contact the solder wire 12 and, although most solder compositions are relatively soft, the solder could cause appreciable wear to ratchet teeth constructed of plastic or other soft materials. The entire ratchet 50 can be constructed of metal; alternatively, a relatively thin sheet of metal bearing the teeth 59 can surround an arcuate body constructed from plastic or other easily-molded material.

The connecting linkages 55, 57 allow the ratchet 50 to pivot towards the front end 22 independently of the trigger lever 52. A spring 80 is disposed to resist any such independent movement and return the ratchet 50 to its rearmost position where an end 82 of the ratchet contacts a tip 84 of the upper end 53 of the trigger lever 52. Thus, if the arcuate ratchet 50 were entirely unrestrained, the end 82 of the ratchet 50 would always be in contact with the tip 84 of the upper end 53 of the trigger lever 52. However, as shown in FIG. 5, when the trigger is in its most extended position forming a maximum angle with the handle 21, a pin 90 interacts with one of the front connecting linkages 55. This interaction prevents the arcuate ratchet 50 from contacting the tip 88 of the upper part 53 of the trigger lever 52. Instead, the ratchet 50 pivots on the connecting linkages 55, 57, causing the ratchet 50 to move in a direction perpendicular to the longitudinal axis of the solder wire 12.

When the trigger lever 52 is pulled towards the handle 21 to dispense the solder wire 12 (FIG. 5), initial travel of the upper end 53 of the trigger lever 52 moves the arcuate ratchet 50 up and into contact with the solder wire 12 as the front connecting linkage 55, biased by the ratchet spring 80, slides against the pin 90. The ratchet 50 is pressed into firm contact with the solder wire 12 so that the ratchet teeth 59 bite into the solder wire 12. The pressure roller 60 presses against the solder wire 12 from an opposite side.

The roller 60 is connected to a pivot arm 62, biased by a spring 64, so that the roller 60 is able to move in an upward direction as the ratchet 50 presses into the solder wire 12. In this way, a variety of solder diameters can be accommodated through movement of the arm 62 and the roller 60, and yet pressure is maintained to hold the teeth 59 in contact with the solder wire 12. Large-diameter solder wires are contacted sooner by the ascending ratchet 50 than are smaller-diameter solder wires. In the case of large-diameter solder wires, the pressure roller 60 moves up farther while maintaining an even pressure on the solder wire 12.

Eventually, as shown in FIG. 6, the rear end 82 of the arcuate ratchet 50 comes into contact with the tip 84 of the upper end 53 of the trigger lever 52. At that point, the ratchet 50 begins to rotate towards the front or dispensing end 22 as if the ratchet 50 and the trigger lever 52 were a single piece, with the pivot 51 representing a center of rotation of an imaginary circle, and with the ratchet 50 forming a segment of a circumference of that circle. Now, the remaining travel of the trigger lever 52 moves a length of solder wire 12 through the orifice 75.

Figure 7:
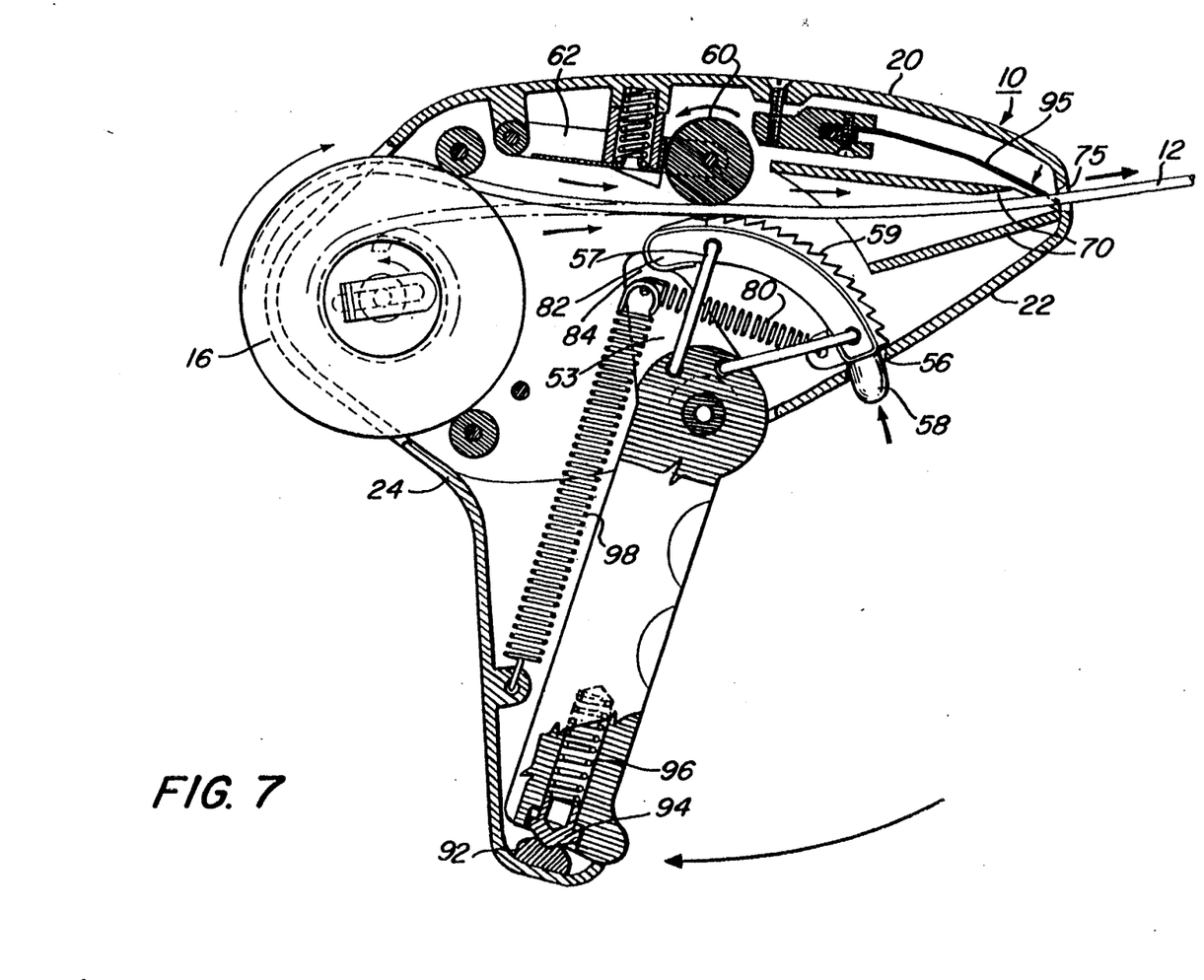
FIG. 7 shows the device as in FIG. 5, but with the trigger lever locked in its rearmost position.

When the trigger lever 52 is maximally pulled, as shown in FIG. 7, the trigger lever 52 is partially enclosed by the hollow handle 21 and locked in place by an interaction between a projection 94 which is biased by a spring 96 and located at a lower end of the trigger lever 52 and a detente 92. At the same time, a button 58 on an end of the ratchet 50 projects through a hole 56 in the housing 20. The user can readily press this projecting button 58 to release the detente locked handle 52. In the locked position the device 10 can more readily fit a storage case. Also, in the locked position the device 10 can be easily held with one hand to present the dispensed length of solder to a flame or other heat source without the trigger lever 52 getting in the way.

When the trigger lever 52 is released, it is returned to its fully-extended position by a trigger bias spring 98. The teeth 59 of the ratchet 50 are still in contact with the solder wire 12. The arcuate shape of the ratchet 50 ensures that maximum contact with the solder wire 12 is made by only a single or a few teeth 59. As the upper end 53 of the trigger lever 53 begins to move towards the source end 24, the contact with the solder wire 12 keeps the ratchet 50 from moving. Unable to move towards the source end 24, the ratchet 50 pivots on the rear connecting links 57 and moves down and away from the solder wire 12. This downward movement continues as long as the teeth 59 contact the solder wire 12. When contact with the solder wire 12 is broken, the ratchet 50 begins to move towards the source end 24. When the pin 90 contacts one of the forward connecting links 55, the ratchet 50 is forced down even farther to allow easy loading and unloading of the solder wire 12 (FIG. 5).

Figure 8:
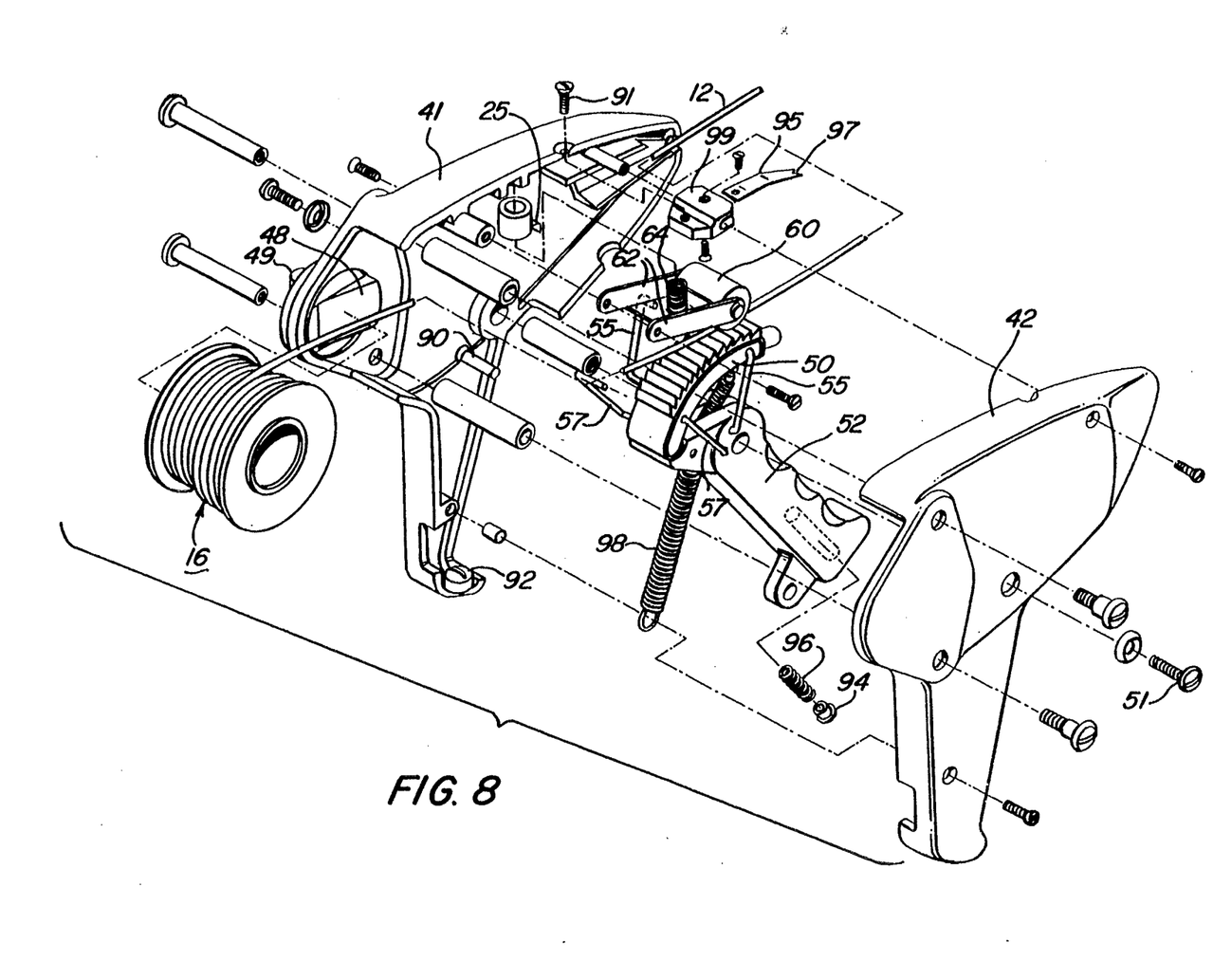
FIG. 8 shows the device of FIG. 1 in an exploded view.

To further ensure against reverse movement of the solder the antireversal spring pawl 95 contacts the solder 12 at a point just before the solder 12 passes through the orifice 75. As shown in FIG. 18, the antireversal pawl 95 comprises a substantially flat strip of spring metal that contacts the solder wire 12 at an acute angle. The solder wire 12 passes through a V-shaped notch 97 (FIG. 8) in an end of the pawl 95. If an attempt is made to move the solder 12 in a reverse direction, the notched end 97 of the antireversal pawl 95 bites into the solder wire 12 and prevents the reverse motion.

An end of the antireversal pawl 95 opposite the notched end 97 is clamped in a holding block 99 that is, in turn, positioned by a screw 91. The screw tension can be released, thereby removing the antireversal pawl 95 from contact with the solder wire 12 and allowing the solder wire 12 to be pulled back for changing the solder reel 16. The screw 91 can readily be replaced with a knob (not shown), thus simplifying release of the solder wire 12. In addition, a ledge 25 (FIG. 8) in the wall of the housing 20 stops the downward movement of the roller arm 62 so that there is an open path between the roller 60 and the ratchet 50 to allow easy insertion or removal of the solder wire 12. The ease of releasing the solder wire 12 makes it feasible to provide reels that contain two different solders side by side. It is simple to withdraw one type of solder and insert the other.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An apparatus for dispensing lengths of solder wire comprising:
    a housing member with at least one handle, the housing member shaped so that the apparatus can easily be operated when held in one hand by an operator;
    an arcuate toothed ratchet mounted within the housing member, shaped as a segment of an imaginary circle and forming less than half of said circle, for contacting a solder wire and moving the solder wire, from a source end towards an outlet opening at an outlet end of the housing member when the ratchet is rotated in a dispensing direction about a center of the circle;
    pressure means for maintaining a force on the solder wire normal to a long axis of the solder wire being contacted by the ratchet;
    activation means for the operator to move in an activation direction and for a spring means to move in an opposite return direction; and
    elevator means for sequentially moving the ratchet in a first direction approximately normal to the solder wire to cause contact with the solder wire and then for rotating the ratchet in the dispensing direction when the activation means is moved in the activation direction, and for moving the ratchet in a second direction, opposite to the first direction, to break contact between the ratchet and the solder wire and then rotating the ratchet in a direction opposite to the dispensing direction when the activation means is moved in the return direction, whereby a length of the solder wire is dispensed from the outlet opening of the housing member each time the operator moves the activation means in the activation direction.

2. The apparatus of claim 1 further comprising friction means for preventing the solder wire from moving when the ratchet rotates in a direction opposite to the dispensing direction.

3. The apparatus of claim 1, wherein the activation means comprises an elongate trigger member pivotally attached at a first end to the housing member at the center of the circle, and extending from the housing member so that the operator can grasp the member trigger-like in one hand and pull it with fingers of the hand.

4. The apparatus of claim 3, wherein the elevator means comprises;
    a first pair of connecting linkages, each linkage pivotally attached at a first terminus to the ratchet near an end of the ratchet towards the outlet end, so that one linkage is attached to each side of the ratchet, and pivotally attached at a second terminus to a first point on the trigger member so that one linkage is attached to each side of the trigger member;
    a second pair of connecting linkages, each linkage pivotally attached at a first terminus to the ratchet near an end of the ratchet towards the source end, so that one linkage is attached to each side of the ratchet, and pivotally attached at a second terminus to a second point, located toward the source end from the first point, on the trigger member so that one linkage is attached to each side of the trigger member;
    a spring connecting the ratchet and the trigger member and biasing the ratchet to pivot on the connecting linkages toward the source end; and
    a contact member fixed to the housing member and contacting at least one of the first pair of connecting linkages so that as the trigger member is moved in the activation direction, the contact member acts against the bias of the spring and the ratchet moves in the first direction approximately normal to the solder wire, thereby contacting the solder wire until a portion of the trigger member contacts the end of the ratchet towards the source whereupon the ratchet is rotated in the dispensing direction.

5. The apparatus of claim 3, wherein the elevator means comprises;
    a first connecting linkage pivotally attached at a first terminus to the ratchet near an end of the ratchet towards the outlet and pivotally attached at a second terminus to a first point on the trigger member;
    a second linkage pivotally attached at a first terminus to the ratchet near an end of the ratchet towards the source end and pivotally attached at a second terminus to a second point on the trigger member, located towards the source end from the first point;
    a spring connecting the ratchet and the trigger member and biasing the ratchet to pivot on the connecting linkages toward the source end; and
    a contact member fixed to the housing member and contacting the first connecting linkage so that as the trigger member is moved in the activation direction, the contact member acts against the bias of the spring and the ratchet moves in the first direction approximately normal to the solder wire, thereby contacting the solder wire until a portion of the trigger member contacts the end of the ratchet towards the source end of the housing member whereupon the ratchet is rotated in the dispensing direction.

6. The apparatus of claim 1, wherein the pressure means comprises:
    an arm member pivotally attached at a first end to the housing member;
    a roller pivotally mounted to the arm member at a second end;
    a spring to bias the arm towards the arcuate ratchet; and
    a stop to limit spring-biased movement of the arm.

7. The apparatus of claim 2, wherein the friction means comprises an elongate strip of spring metal attached at a first end to the housing member, oriented to meet the solder wire at a second end forming an acute angle whose vertex points to a source end of the solder wire and having a V-shaped notch at the second end with the solder wire passing through the notch.

8. An apparatus for dispensing lengths of solder wire comprising:

a gun-shaped housing member comprising a body and a handle and shaped so that the apparatus can easily be operated when held in one hand by an operator;

an arcuate toothed ratchet mounted within the body, shaped as a segment of an imaginary circle and forming about one-quarter of said circle, for contacting a solder wire and moving the solder wire, from a reel at a source end of the body towards an outlet at a dispensing end of the body, when the ratchet is rotated, in a dispensing direction, about a center of the circle;

pressure means, attached to the body, for maintaining a force on the solder wire normal to a long axis of the solder wire being contacted by the ratchet;

a trigger member, pivotally attached to a lower surface of the body, for the operator to move towards the handle and for a return spring to move in a return direction towards the dispensing end;

a first pair of connecting linkages, each linkage pivotally attached at a first terminus to the ratchet near an end of the ratchet towards the outlet end of the body, so that one linkage is attached to each side of the ratchet, and pivotally attached at a second terminus to a first point on the trigger member so that one linkage is attached to each side of the trigger member;

a second pair of connecting linkages, each linkage pivotally attached at a first terminus to the ratchet near an end of the ratchet towards the source end of the body, so that one linkage is attached to each side of the ratchet, and at a second terminus to a second point, located towards the source end from the first point, on the trigger member so that one linkage is attached to each side of the trigger member;

a spring connecting the ratchet and the trigger member and biasing the ratchet to pivot on the connecting linkages toward the source end; and a stop pin fixed to the housing member and contacting at least one of the first pair of connecting linkages so that as the trigger member is moved towards the handle, the contact member acts against the bias of the spring and the ratchet moves up in a direction approximately normal to the solder wire, thereby contacting the solder wire until a portion of the trigger member contacts the end of the ratchet towards the source end whereupon the ratchet is rotated in the dispensing direction thereby dispensing a length of the solder wire from the outlet each time the operator moves the trigger member towards the handle.

9. The apparatus of claim 8, wherein the handle is hollow with an elongate opening towards the trigger member, the opening sized to accept the trigger member when the trigger member is pivoted into the hollow handle where it is retained by an interaction between a detente in the handle and a spring-loaded projection on the trigger member until released by pressure on an end of the arcuate ratchet which protrudes through an opening in the body of the housing member.

10. The apparatus of claim 8, wherein the reel is retained in the body of the housing member by a spring-loaded tab having an extension thereof to an exterior surface of the apparatus so that the reel can be released for changing by exerting pressure on the extension of the tab.

11. An apparatus for dispensing lengths of solder wire comprising:

a gun-shaped housing member comprising a body and a handle and shaped so that the apparatus can easily be operated when held in one hand by an operator;

an arcuate toothed ratchet mounted within the body, shaped as a segment of an imaginary circle and forming about one-quarter of said circle, the teeth on an upper surface thereof for contacting a solder wire and moving the solder wire, from a reel at a source end of the body towards an outlet at a dispensing end of the housing member body, when the ratchet is rotated, in a dispensing direction, about a center of the circle;

a roller mounted on a spring-loaded pivot arm, attached within the body, for maintaining a force on the solder wire normal to a long axis of the solder wire being contacted by the ratchet;

a pawl, a first end of the pawl attached to the housing member and a second end of the pawl contacting the solder and making an acute angle with the solder, the vertex of the angle facing the outlet end, to prevent movement of the solder towards the source end;

a trigger member, pivotally mounted to the body by an upper end, for the operator to move towards the handle and for a spring means to move away from the handle in a return direction;

a first pair of connecting linkages, each linkage pivotally attached at a first terminus to the ratchet near an end of the ratchet towards the outlet end of the body, so that one linkage is attached to each side of the ratchet, and pivotally attached at a second terminus to a first point on the trigger member so that one linkage is attached to each side of the trigger member;

a second pair of connecting linkages, each linkage pivotally attached at a first terminus to the ratchet near an end of the ratchet towards the source end of the body, so that one linkage is attached to each side of the ratchet, and at a second terminus to a second point, located towards the source end from the first point, on the trigger member so that one linkage is attached to each side of the trigger member;

a spring connecting the ratchet and the trigger member and biasing the ratchet to pivot on the connecting linkages towards the source end; and a pin, acting as a stop, fixed to the housing member and contacting at least one of the first pair of connecting linkages so that as the trigger member is moved towards the handle, the pin acts against the bias of the spring and the ratchet moves up in a direction approximately normal to the solder wire, thereby contacting the solder wire and pressing it against the roller until an upper part of the trigger member contacts the end of the ratchet towards the source end whereupon the ratchet is rotated in the dispensing direction thereby dispensing a length of the solder wire from the outlet each time the operator moves the trigger member toward the handle.

12. The apparatus of claim 11, wherein the handle is hollow with an elongate opening towards the trigger member, the opening sized to accept the trigger member when the trigger member is pivoted into the hollow handle where it is retained by an interaction between a detente in the handle and a spring-loaded projection on the trigger member until released by pressure on an end of the arcuate ratchet which protrudes through an opening in the body of the housing member.

13. The apparatus of claim 11, wherein the reel is retained in the body of the housing member by a spring-loaded tab having an extension thereof to an exterior surface of the apparatus so that the reel can be released for changing by exerting pressure on the extension of the tab.

14. The apparatus of claim 11, wherein the first end of the pawl is attached to the housing member through a block connected to a knob on an outer surface of the apparatus so that operating the knob releases the pawl allowing the solder to move towards the source end for changing the reel.

15. The apparatus of claim 11, wherein the reel further comprises two side-by-side sections of solder so that two types of solder can be alternatively fed to the ratchet.

16. The apparatus of claim 11, wherein the teeth of the toothed ratchet are asymmetric and point towards the outlet end of the body.

* * * * *